(12) United States Patent
Phadke (10) Patent No.: US 8,576,591 B2
(45) Date of Patent: Nov. 5, 2013

(54) CONVERTERS AND INVERTERS FOR PHOTOVOLTAIC POWER SYSTEMS

(75) Inventor: Vijay G. Phadke, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 12/976,544

(22) Filed: Dec. 22, 2010

(65) Prior Publication Data
US 2012/0081937 A1 Apr. 5, 2012

Related U.S. Application Data

(60) Provisional application No. 61/388,417, filed on Sep. 30, 2010.

(51) Int. Cl.
*H02J 1/10* (2006.01)
*H02M 3/335* (2006.01)

(52) U.S. Cl.
USPC .......... 363/65; 363/16; 363/20; 363/124; 323/284; 323/906

(58) Field of Classification Search
USPC .......... 323/284, 906; 363/65, 16, 20, 124; 307/82
See application file for complete search history.

(56) References Cited

U.S. PATENT DOCUMENTS

| | | | |
|---|---|---|---|
| 4,404,472 A | 9/1983 | Steigerwald | |
| 6,127,621 A | 10/2000 | Simburger | |
| 6,717,386 B1 * | 4/2004 | Kanasugi et al. | 322/27 |
| 6,788,556 B2 * | 9/2004 | Hosotani et al. | 363/21.15 |
| 6,966,184 B2 | 11/2005 | Toyomura et al. | |
| 7,161,331 B2 * | 1/2007 | Wai et al. | 323/222 |
| 7,900,361 B2 | 3/2011 | Adest et al. | |
| 8,228,697 B2 * | 7/2012 | Wagoner | 363/95 |
| 8,259,479 B2 * | 9/2012 | Wagoner et al. | 363/97 |
| 8,273,979 B2 * | 9/2012 | Weir | 136/244 |
| 8,289,742 B2 * | 10/2012 | Adest et al. | 363/71 |
| 2008/0097655 A1 | 4/2008 | Hadar et al. | |
| 2008/0136367 A1 | 6/2008 | Adest et al. | |
| 2008/0143188 A1 | 6/2008 | Adest et al. | |
| 2008/0144294 A1 | 6/2008 | Adest et al. | |
| 2008/0147335 A1 | 6/2008 | Adest et al. | |
| 2008/0150366 A1 | 6/2008 | Adest et al. | |
| 2009/0150005 A1 | 6/2009 | Hadar et al. | |
| 2009/0236917 A1 | 9/2009 | Bettenwort et al. | |
| 2010/0001587 A1 | 1/2010 | Casey et al. | |
| 2010/0026097 A1 | 2/2010 | Avrutsky et al. | |
| 2010/0321962 A1 * | 12/2010 | Lee et al. | 363/21.12 |

FOREIGN PATENT DOCUMENTS

JP 2000-112545 4/2000

* cited by examiner

*Primary Examiner* — Gary L Laxton
(74) *Attorney, Agent, or Firm* — Harness, Dickey & Pierce, P.L.C.

(57) ABSTRACT

A power system includes a plurality of DC/DC converters and a DC/AC inverter. The plurality of DC/DC converters having outputs electrically connected in parallel for supplying a DC voltage bus to an input of the DC/AC inverter. The plurality of DC/DC converters each include a maximum power point tracker (MPPT). Various DC/DC converters and DC/AC inverters suitable for use in this system and others are also disclosed.

24 Claims, 6 Drawing Sheets

CONVERTERS AND INVERTERS FOR PHOTOVOLTAIC POWER SYSTEMS

CROSS-REFERENCE TO RELATED APPLICATION

This application claims the benefit of U.S. Provisional Application No. 61/388,417 filed on Sep. 30, 2010. The entire disclosure of the above application is incorporated herein by reference.

FIELD

The present disclosure relates to photovoltaic power systems, DC/DC converters and DC/AC inverters for use in such systems, and related methods.

BACKGROUND

This section provides background information related to the present disclosure which is not necessarily prior art.

Photovoltaic (PV) devices convert sunlight to electricity. A PV device may consist of a single panel, multiple panels, rigid panels, flexible panels, serial panels, parallel panels, etc. The output of a PV device is typically unregulated (i.e. the output varies with changes in sunlight intensity, temperature, etc.). Further, the output of one PV device may differ from the output of another PV device due to manufacturing variations, different operating temperatures, unequal ageing, different positioning and/or mounting angles, different shading from trees, structures or clouds, different amounts of dirt or debris on the respective PV devices, etc.

SUMMARY

This section provides a general summary of the disclosure, and is not a comprehensive disclosure of its full scope or all of its features.

According to one aspect of the present disclosure, a power system includes a plurality of DC/DC converters and a DC/AC inverter. The plurality of DC/DC converters have outputs electrically connected in parallel for supplying a DC voltage bus to an input of the DC/AC inverter. Further, each DC/DC converter includes a maximum power point tracker (MPPT).

According to another aspect of the present disclosure, a DC/DC converter includes an input, an output, at least one power switch coupled between the input and the output, and a controller configured to provide a power delivery curve having a power-decreasing-with-voltage region.

According to another aspect of the present disclosure, a DC/DC converter includes an input, an output, at least one power switch coupled between the input and the output, and a controller having a maximum power point tracker (MPPT). The controller is configured to run its MPPT when the output voltage of the DC/DC converter is pulled below a first voltage.

According to yet another aspect of the present disclosure, a DC/DC converter includes an input, an output, at least one power switch coupled between the input and the output, and a high resistance path for limiting start-up current.

According to still another aspect of the present disclosure, a DC/AC inverter includes an input, an output, and a controller configured to maintain a voltage at the input within a defined voltage range.

Some example embodiments of power systems, DC/DC converters, DC/AC inverters and related methods incorporating one or more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
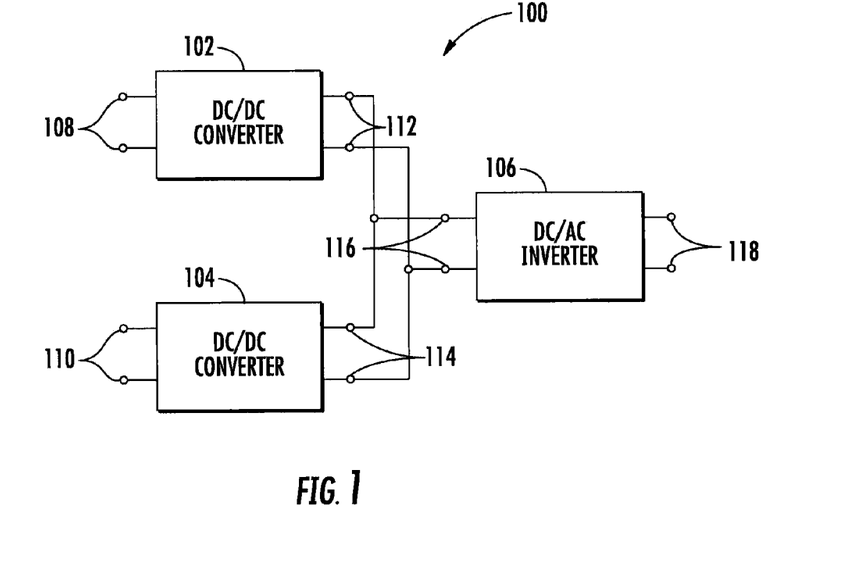
FIG. 1 is a block diagram of a system comprising a plurality of DC/DC converters for supplying power to a DC/AC inverter according to one example embodiment of the present disclosure.

A system according to one example embodiment of the present disclosure is illustrated in FIG. 1 and indicated generally by reference number 100. As shown in FIG. 1, the system 100 includes two DC/DC converters 102, 104 and a DC/AC inverter 106. Each DC/DC converter has an input 108, 110 for connection to an input power source. The converters also include outputs 112, 114 electrically connected in parallel to provide a DC voltage bus to an input 116 of the DC/AC inverter. The bus voltage may be fixed or variable.

Each converter 102, 104 includes a maximum power point tracker (MPPT) that endeavors to harvest maximum power from its input power source. Additionally, each converter 102, 104 is preferably configured to operate independently of any external control signal (e.g., from a system controller or another DC/DC converter). The converters 102, 104 may be substantially identical to one another. Alternatively, converter 102 may be a different type and/or size than converter 104. In some embodiments, each converter is sized to match its input power source.

The inverter 106 may be an isolated or non-isolated inverter. Preferably, the inverter 106 is configured to control the bus voltage provided to its input 116. For example, the inverter 116 may control the amount of current it draws from the converters to control the bus voltage.

The inverter 106 may also include an MPPT (in addition to the converter MPPTs). If the inverter 106 does not include an MPPT (and even if it does), it is preferably configured to regulate its input voltage and/or current in a manner that is compatible with operation of the converter MPPTs (e.g., so the inverter presents a sufficient but not excessive load to the converters during normal operation). Further, the inverter 106 may be a grid-tie inverter (i.e., configured for connecting its output 118 to a utility power grid) or a non-grid-tie inverter (e.g., a residential inverter).

Although two converters 102, 104 are shown in FIG. 1, it should be understood that less (i.e., one) or more converters may be used in other embodiments of this disclosure. Further, it should be understood that the converters 102, 104 may be used in other systems apart from the inverter 106, and the inverter 106 may be used in other systems apart from the converters 102, 104, without departing from the scope of this disclosure.

Figure 2:
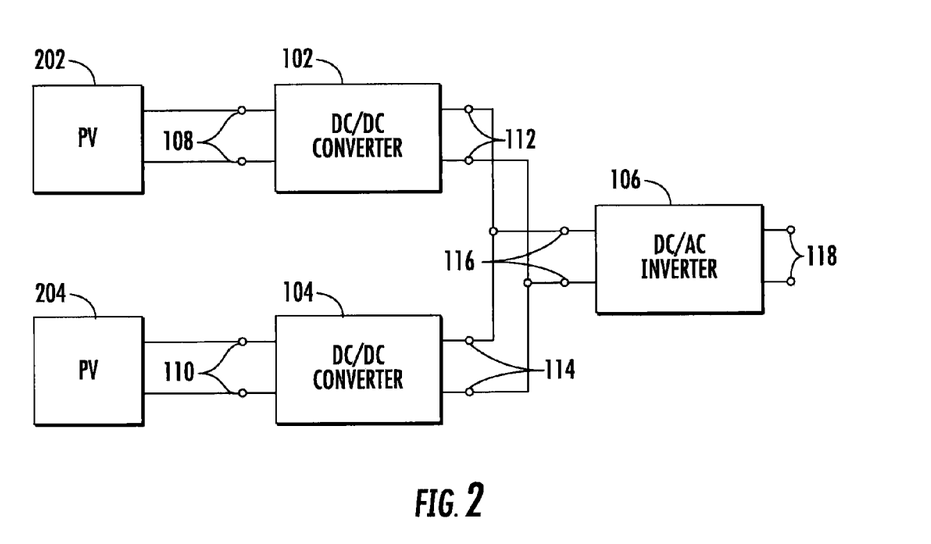
FIG. 2 is a block diagram of the system of FIG. 1 coupled to a plurality of photovoltaic (PV) panels according to another example embodiment.

The system 100 of FIG. 1 can be used with photovoltaic (PV) input power sources, as shown in FIG. 2. More specifically, the converter inputs 108, 110 may be coupled to photovoltaic (PV) panels 202, 204. Panel 202 may be a different type and/or size of panel than PV panel 204. In that event, the type and size of converters 102, 104 are preferably matched to the type and size of panels 202, 204, respectively. The flexibility to mix-and-match converters of various types and/or power ratings allows each DC/DC converter to be optimized for its input power source.

Each converter may be physically mounted behind or near its associated PV panel. Alternatively, one or more converters may be located away from its panel, e.g., in a central area, etc.

Preferably, the MPPT in each converter 102, 104 adjusts its input voltage and/or input current as necessary to track the maximum power point (MPP) of its PV panel 202, 204 and thereby extract maximum power from the panels. As noted above, the inverter 106 may also include an MPPT for maintaining the bus voltage and/or bus current at level(s) that maximize the amount of overall power extracted from the panels and converters as a group. For example, the inverter 106 may be an off-the-shelf grid-tie solar inverter having an MPPT.

If the inverter 106 does not include a MPPT (and even if it does), the inverter is preferably configured to maintain its input voltage and/or input current at level(s) that do not interfere with operation of the converter MPPTs. For example, if each converter 102, 104 is configured to run its MPPT when the converter's output voltage is between 300 and 400 VDC, the inverter 106 may be configured to maintain its input voltage (i.e., the bus voltage) between 300 and 400 VDC. In this manner, the inverter 106 can maximize the amount of power harvested from the PV panels 202, 204 by the converters 102, 104.

Although only two converters 102, 104 and two PV panels 202, 204 are shown in FIG. 2, it should be understood that more converters and PV panels can be used in other embodiments. Further, while each converter 102, 104 is coupled to the output terminals of only one PV panel in the example of FIG. 2, each converter may be coupled to series or parallel combination(s) of multiple PV panels in other embodiments of this disclosure.

Figure 3:
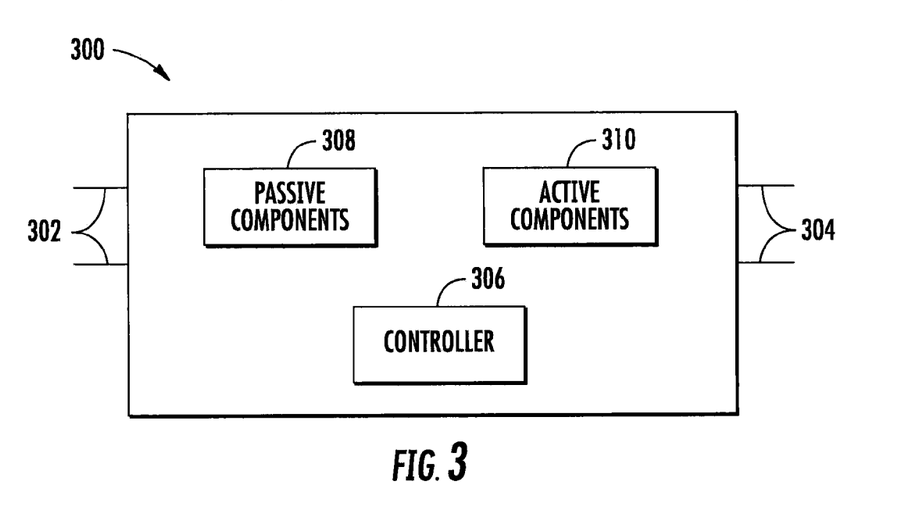
FIG. 3 is a general block diagram of a DC/DC converter according to another example embodiment.

FIG. 3 illustrates a DC/DC converter 300 suitable for use as one of the converters 102, 104 in FIGS. 1 and 2. As shown in FIG. 3, the DC/DC converter 300 includes an input 302, an output 304, a controller 306, passive components 308, and active components 310. The controller 306 is preferably a digital controller. The controller 306 is configured to operate one or more of the active components 310 (e.g. power switches, etc.) to control operation of the converter 300. The controller 306 is also configured to perform a MPPT method for tracking the maximum power point of an input power source coupled to the input 302. For example, the controller 306 may be configured to adjust the duty cycle of one or more power switches as necessary to draw substantially maximum power from the input power source. Suitable MPPT methods include perturb-and-observe ("P & O"), constant input current regulation, constant input voltage regulation, predictive maximum power point tracking using defined characteristics of the input power source, etc).

In addition, the controller 306 need not be responsive to any external control signals (i.e., the controller may be configured to control operation of the converter 300 independently). In the example embodiment of FIG. 3, the controller 306 is not responsive to any external control signals (e.g., from a central controller or another DC/DC converter).

The converter 300 may include one or more power stages. Each stage may employ any suitable power conversion topology including buck, boost, buck-boost, etc. Additionally, one or more stages may be galvanically isolated (e.g., via an isolation transformer). The converter's MPPT may be implemented via the first and/or subsequent stages (when applicable) of the converter.

Additionally (or alternatively), the controller 306 may be configured (e.g., via software) to run its MPPT when the output voltage of the converter is pulled below a threshold level (e.g., by the load). For example, the controller may initially run an output voltage (or current) regulation mode. Subsequently, when the output voltage is pulled below the voltage regulation level (e.g., indicating the presence of a load), the controller may switch from the voltage regulation mode to an MPPT mode.

In addition (or alternatively), the controller 306 may be configured to stop running its MPPT when, e.g., the output voltage returns (i.e., rises) to the voltage regulation level. In that event, the controller 306 may revert to the voltage regulation mode. In this manner, if a load (e.g., the inverter 106) stops accepting maximum power from the converter, the converter may stop supplying maximum power.

In addition (or alternatively), the controller 306 may be configured to stop running the MPPT when the output voltage (or current) reaches a threshold level, such as a low voltage threshold. During the MPPT mode, the output current generally increases as the output voltage decreases. The controller will preferably stop running the MPPT when the output voltage of the converter (or another converter voltage) falls below a defined voltage to prevent high current damage to the converter. At the same time, the controller may shutdown completely, disable one or more stages of the converter, revert to a voltage or current regulation mode, etc. In the event multiple converters of the type shown in FIG. 3 are used in the system 100, the threshold levels (e.g., voltage thresholds) at which each converter starts and/or stops its MPPT may be the same. Alternatively, the threshold level(s) for one converter may be different than the threshold level(s) of one or more other converters. For example, the voltage threshold levels of multiple converters may be staggered with respect to one another, so the converters start and/or stop delivering maximum power to the load in a defined sequence (e.g., one at a time, two at a time, etc.). Thus, one converter may start delivering maximum power when the bus voltage is pulled below 400 VDC, another converter may start delivering maximum power when the bus voltage is pulled below 398 VDC, and so on.

Additionally (or alternatively), the controller 306 may be configured to provide a power-decreasing-with-voltage region. For example, the converter may have one of the power delivery curves 400 shown in FIG. 4. The example power delivery curves 400 include a power-decreasing-with-voltage region 402. In this region 402, the output power of the converter decreases as the output voltage decreases below 300 VDC. The example curves 400 (for various input power levels) also include a constant power region 404. In this region 404, the converter is running its MPPT so the output voltage of the converter increases as the output current decreases (and vice versa), assuming the power input to the converter is substantially constant. The transition between regions 402 and 404 is referred to as the knee voltage 406.

The power-decreasing-with-voltage region 402 is particularly useful when the converter is coupled to an inverter having a MPPT. Because pulling the converter output voltage below 300 VDC will reduce rather than maximize the power input to the inverter, the inverter's MPPT will generally maintain the converter output voltage (e.g., the bus voltage in FIGS. 1 and 2) above the knee voltage 406 (i.e., above 300 VDC in the example of FIG. 4).

In the example power delivery curves 400 of FIG. 4, the output power of the converter decreases linearly as the output voltage decreases below the knee voltage 406. Alternatively, the output power may decrease non-linearly. For example, the converter 300 may have one of the power delivery curves 500 shown in FIG. 5. The example power delivery curves 500 include a first power-decreasing-with-voltage region 502 and a second power-decreasing-with-voltage region 503, as well as a constant power region 504. The second region 503 has a greater slope than the first region 502. As a result, the power delivery curves 500 have a gentler transition from the constant power region 504 to the first power-decreasing-with-voltage region 502 (at the knee voltage 506) than from the first power-decreasing-with-voltage region 502 to the second power-decreasing-with-voltage region 503.

Figure 4:
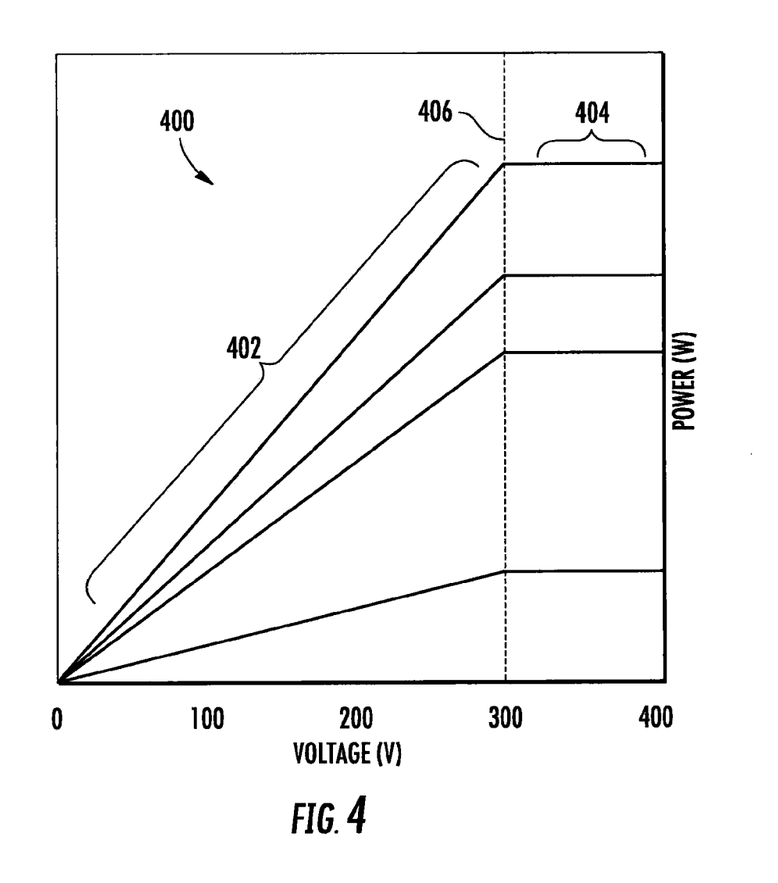
FIG. 4 illustrates example power delivery curves for the converter of FIG. 3 according to another example embodiment.
Figure 5:
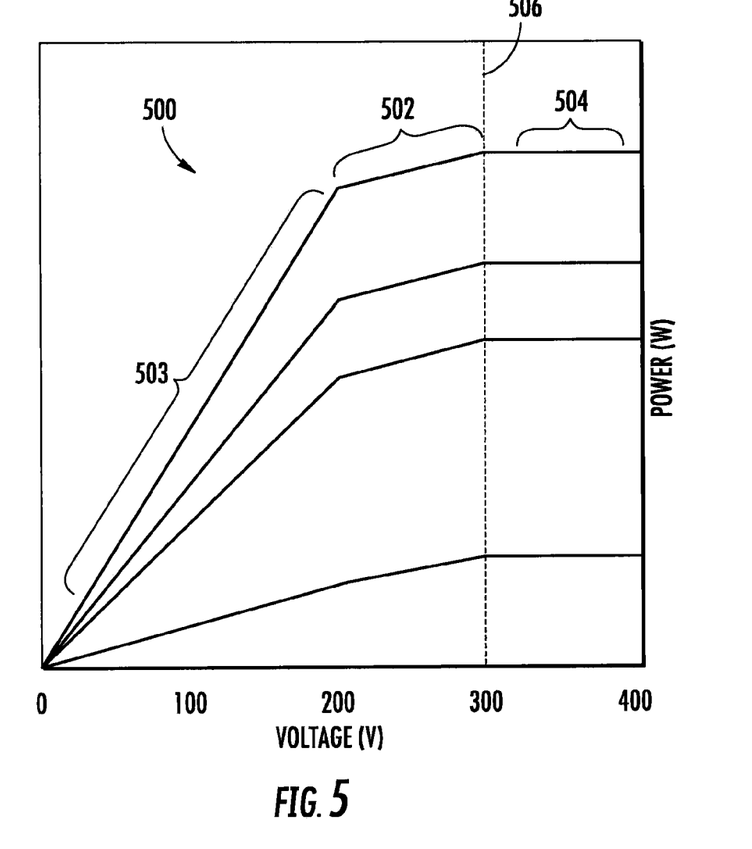
FIG. 5 illustrates additional example power delivery curves for the converter of FIG. 3.

Although the example power delivery curves of FIGS. 4 and 5 have power-decreasing-with-voltage regions that extend between zero and 300 VDC, it should be understood that other voltage ranges (including those that begin well above zero volts) and other power delivery curves may be employed in other embodiments of this disclosure.

When the input of the converter 300 is coupled to a PV panel (such as PV panel 202 or 204), the power delivery curve(s) of the converter are preferably similar to the power delivery curve(s) of its PV panel. As a result, the converter will respond to the inverter (which may be a solar inverter designed for coupling directly to a PV panel) like a PV panel.

Figure 6:
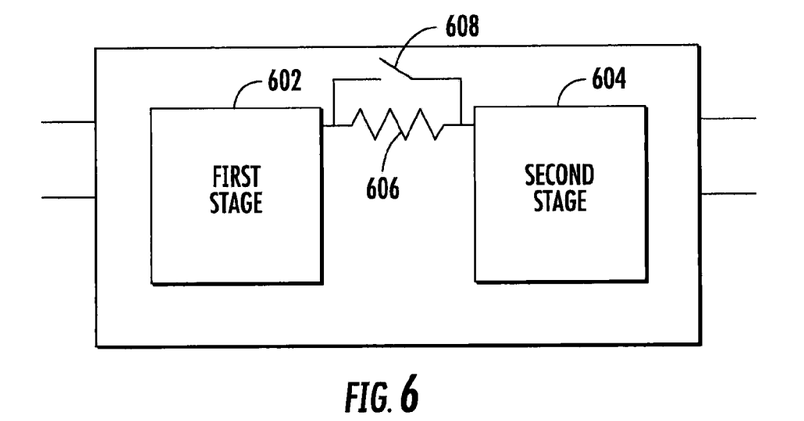
FIG. 6 is a block diagram of an example two-stage embodiment of the DC/DC converter of FIG. 3.

Additionally (or alternatively), the converter 300 may include a high current path to limit current flow under certain conditions, such as during start-up of the converter. For example, the converter 300 may include two power stages as shown in FIG. 6. In particular, the converter 300 may include a first power stage 602 coupled to a second power stage 604 by a resistor 606. A switch 608 may be connected in parallel with the resistor for selectively bypassing (i.e., electrically shorting) the resistor 606. When the switch is open, the resistor limits the amount of current delivered to the second stage. When the switch is closed, the resistor is effectively removed and no longer limits the flow of current between the first and second stages. In some embodiments, the switch 608 is held open during start-up of the second stage 604. During this time, the resistor 606 provides a high resistance path that limits current. Subsequently, when the output voltage (or another voltage) of the converter reaches a defined level, the switch 608 may be closed to bypass the resistor and allow increased current flow to the second stage (and the load). Similarly, when the output voltage of the converter falls below a defined level (e.g., indicating the load is pulling too much current), the switch 608 may be opened to limit current flow. Further, the converter 300 may be configured to open the switch when the output voltage of the first stage 602 cannot be maintained above the input voltage of the first stage 602 (particularly if the first stage 602 employs a boost topology).

Additionally, the example circuit configuration of FIG. 6 protects the converter 300 from short circuit faults at its output (e.g., on the voltage bus of FIGS. 1 and 2), as well as from damage that could otherwise result if the converter 300 is connected (e.g., in system 100) with the wrong polarity.

In addition (or alternatively), the converter 300 may be configured to limit start-up current in other ways, to protect the converter and/or to prevent exceeding the current capacity of its input power source. As an example, the controller 306 may be configured to constrain the duty cycle of a power switch until the output voltage (or another parameter) of the converter reaches a threshold level.

Alternatively (or additionally), the converter 300 may include one or more diodes for preventing reverse current flow to a power source coupled to the input (such as PV panels 202, 204).

Figure 7:
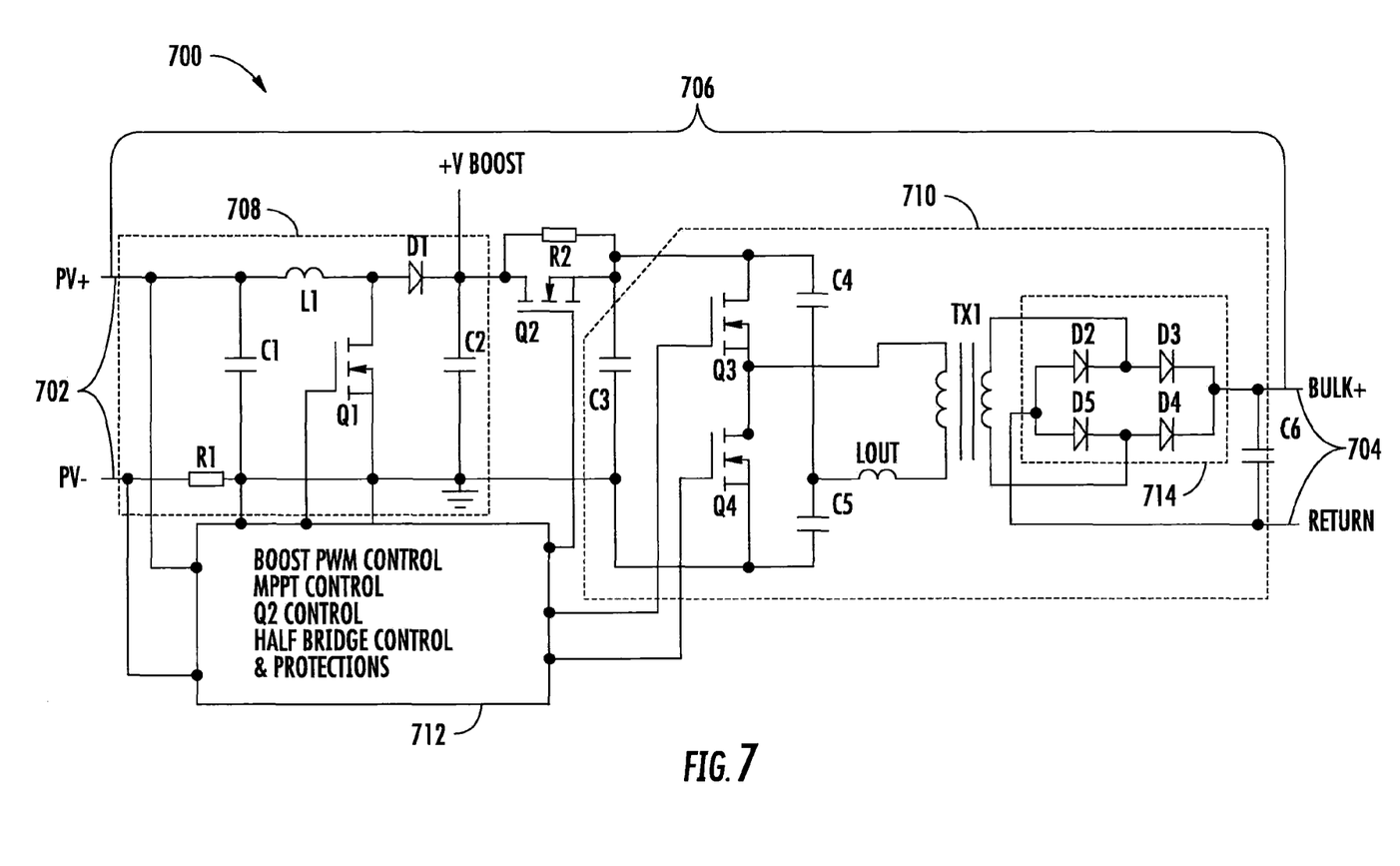
FIG. 7 is a schematic diagram of a DC/DC converter according to another example embodiment of the present disclosure.

FIG. 7 illustrates another example DC/DC converter 700 suitable for use as one of the converters 102, 104 in FIGS. 1 and 2. As shown in FIG. 7, the DC/DC converter 700 includes an input 702, an output 704, and a switching power supply 706 coupled between the input 702 and the output 704. The switching power supply 706 is a two-stage boost converter that includes a first stage 708, a second stage 710, a controller 712, a switch Q2, and a resistor R2. The switch Q2 couples the first stage 708 to the second stage 710. The resistor R2 is connected in parallel with the switch Q2. The second stage 710 includes an isolation transformer TX1 and a diode bridge 714.

In the example of FIG. 7, the second stage 710 is an isolation bus converter stage that steps up the output voltage of the first stage 708 with galvanic isolation to a desired second voltage level. More specifically, the second stage 710 is a fixed frequency resonant half bridge converter configured for operating near boundary conduction mode. Zero voltage and zero current switching are also employed for high efficiency.

Additionally, the converter 700 of FIG. 7 may include one or more (e.g., all) of the features of converter 300 described above with reference to FIGS. 3-6.

An example operation of the converter 700 will now be described with reference to FIGS. 2 and 7. For this example, assume the converters 102, 104 in FIG. 2 each have the circuit configuration shown in FIG. 7. In other words, assume two identical converters 700 are used as the converters 102, 104 in FIG. 2. The following description will focus on converter 102 and PV panel 202, but may also apply to converter 104 and PV panel 204.

Preferably, the first stage 708 of converter 102 is configured to boost its input voltage to a level greater than the maximum open circuit voltage expected from its PV panel 202. Assuming the maximum open circuit voltage of panel 202 is 75V, the output voltage of the first stage 708 may be 80V. Assuming further the desired output voltage of the second stage 710 is 400 V, the second stage requires a 1:5 boost ratio.

When energy is available from the PV panel 202 and the panel voltage is greater than a minimum threshold level, an internal auxiliary power converter (not shown in FIG. 7) will start up to generate internal bias voltages for the converter 102. If the PV panel 202 does not produce sufficient power to start the low power auxiliary converter for biasing, the auxiliary converter will continue its attempts to turn on. When the panel 202 produces sufficient energy to start the auxiliary converter (to power the controller 712), the controller 712 will attempt to start the first stage 708. If the panel 202 does not produce sufficient power to sustain the minimum no load power of the first stage 708, repeated attempts may be made. This behavior is expected at dawn, when radiation increases with the rising sun. At some point, the first stage 708 will start up and deliver a regulated output voltage of 80V at no load. During this time, switch Q2 is disabled (i.e., open) and the second stage 710 is disabled.

Once the first stage 708 is successfully started, the second stage is enabled. Initially, switch Q2 is held off (i.e., open) so the second stage 710 receives only limited power due to the resistor R2. During this time, a PV input voltage regulation loop may be activated to ensure the voltage provided by the panel 202 does not slip to zero. The regulated input voltage level may be, for example, 70% of the input voltage observed before the second stage 710 was enabled. The 70% level may be used if the MPP voltage of panel 202 is between 75% to 85% of its open circuit voltage. Alternatively, another input voltage regulation level may be employed.

The inverter 106 may include a large bulk capacitance that will create a near short-circuit on the output 704 of the converter 102 during the power-up cycle. Also, other DC/DC converters connected in parallel with converter 102 (including converter 104) may not start at the same time. Due to the series insertion of R2, the output voltage of the second stage 710 will rise slowly, allowing the controller 712 to identify the nature of the load. The voltage at the output 704 is reflected across capacitor C3 where it may be monitored by the controller 712. As this voltage rises and exceeds the 70% clamp level set for controlling the input voltage, the switch Q2 is turned on. Now more energy can be supplied to charge the load capacitance as the current limit resistor R2 has been bypassed.

As the converter 102 starts to deliver power to the inverter 106, the controller's MPPT is activated to monitor the PV input current and voltage and operate as close to the MPP as possible.

The current limit network of switch Q2 and resistor R2 also protects the converter 700 from short circuit faults on the output 704 and may prevent damage if the converter 700 is connected with wrong polarity. The current limit network may prevent the destruction of the converter connected in wrong polarity as other parallel converters will see a short circuit and may operate in current limit mode. Each converter may eventually disable itself if the control circuit observes that the output bus voltage is not able to rise in preset time duration.

In this example embodiment, the second stage 710 includes an isolation transformer TX1 which galvanically isolates the input 702 from the output 704. Further, the second stage 710 includes a diode bridge 714 which prevents current from flowing from the output 704 to the input 702.

Figure 8:
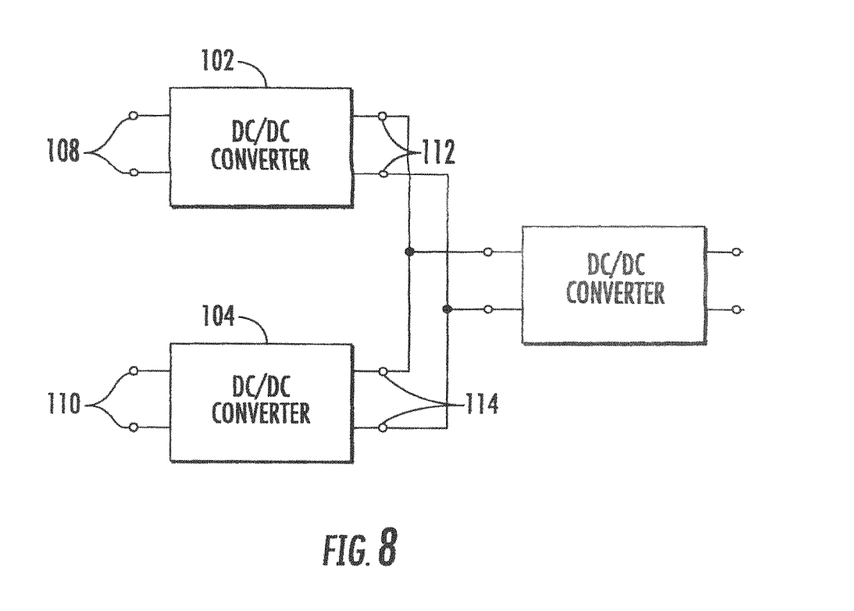
FIG. 8 is a block diagram of a system comprising a plurality of DC/DC converters for supplying a bus voltage to another DC/DC converter according to another example embodiment.
Figure 9:
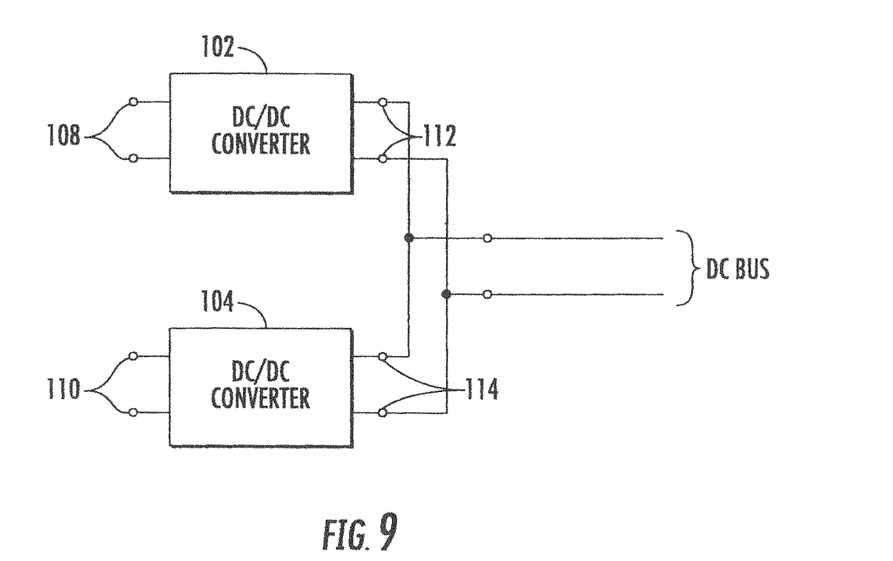
FIG. 9 is a block diagram of a system comprising a plurality of DC/DC converters for supplying a bus voltage to a DC bus according to yet another example embodiment.
Figure 10:
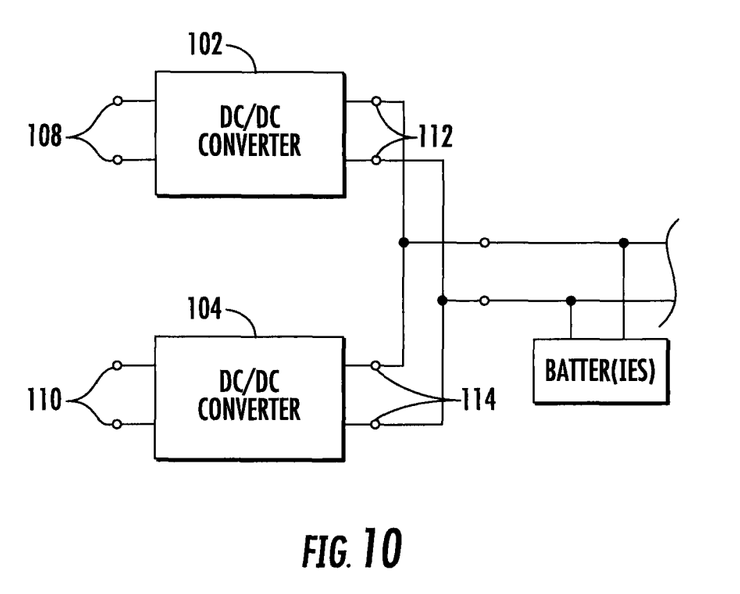
FIG. 10 is a block diagram of a system comprising a plurality of DC/DC converters for supplying a bus voltage to one or more batteries according to still another example embodiment of the present disclosure.

It should be understood that, in other embodiments of this disclosure, the inverter 106 in FIGS. 1 and 2 can be omitted and/or replaced by another component. For example, the inverter 106 can be replaced by a DC/DC converter (as shown in FIG. 8), e.g., for reducing or increasing the DC bus voltage level. Alternatively, the inverter 106 may be omitted so the DC bus voltage provided by the converters 102, 104 may be coupled to a DC bus (e.g., a 48V or 400V bus in a DC power distribution system), as shown in FIG. 9. In that event, the converters 102, 104 (and possibly additional converters all connected in parallel) may be either the sole or a supplemental power source for the DC bus. As another alternative, the inverter 106 may be omitted so the DC bus voltage provided by the converters 102, 104 may be coupled to one or more batteries (including a battery bank), as shown in FIG. 10. In that event, the DC bus voltage provided by the converters 102, 104 is preferably slightly greater than any grid fed battery charger so, e.g., power is drawn from the PV panels 202, 204 first, and then from the utility grid.

The devices and methods of the present disclosure are not limited to photovoltaic applications. For example, the devices and methods of the present disclosure may be used with other distributed power applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A DC/DC converter having an input, an output for providing an output voltage, at least one power switch coupled between the input and the output, and a controller for operating the at least one power switch to control operation of the DC/DC converter, the controller configured to operate in a maximum power point tracker (MPPT) mode when the output voltage of the DC/DC converter is above a threshold level, and to operate the DC/DC converter in a power decreasing with decreasing voltage region of a power delivery curve of the DC/DC converter when the output voltage is below the threshold level.

2. The DC/DC converter of claim 1 wherein the controller is configured to control operation of the DC/DC converter substantially independently.

3. The DC/DC converter of claim 2 wherein the controller is configured to decrease an output power of the DC/DC converter linearly as the output voltage decreases below the threshold level.

4. The DC/DC converter of claim 1 wherein the power delivery curve of the DC/DC converter includes a first power decreasing with decreasing voltage region having a first slope and a second power decreasing with decreasing voltage region having a second slope that is different than the first slope.

5. The DC/DC converter of claim 1 wherein the input of the DC/DC converter is coupled to a photovoltaic (PV) device.

6. The DC/DC converter of claim 5 wherein the output of the DC/DC converter is coupled to a DC/AC inverter having a maximum power point tracker (MPPT) mode.

7. The DC/DC converter of claim 5 wherein the output of the DC/DC converter is coupled to a DC/DC converter.

8. The DC/DC converter of claim 5 wherein the output of the DC/DC converter is coupled to a DC bus.

9. The DC/DC converter of claim 1 wherein the DC/DC converter includes at least a first power stage and a second power stage.

10. The DC/DC converter of claim 9 wherein the first power stage is coupled to the second power stage via a high resistance path.

11. The DC/DC converter of claim 10 further comprising a switch coupled in parallel with the high resistance path for selectively bypassing the high resistance path.

12. A system comprising at least two DC/DC converters, each DC/DC converter having an input, an output for providing an output voltage, at least one power switch coupled between the input and the output, and a controller for operating the at least one power switch, each controller configured to operate in a maximum power point tracker (MPPT) mode when the output voltage of its DC/DC converter is above a threshold level, and to operate its DC/DC converter in a power decreasing with decreasing voltage region of a power delivery curve of its DC/DC converter when the output voltage of its DC/DC converter is below the threshold level.

13. The system of claim 12 wherein the outputs of the at least two DC/DC converters are electrically connected in parallel.

14. The system of claim 13 further comprising a DC/AC inverter having an input, an output and a controller configured to operate in a maximum power point tracker (MPPT) mode, the input of the DC/AC inverter electrically connected to the outputs of the at least two DC/DC converters.

15. The system of claim 14 wherein the input of each DC/DC converter is coupled to a photovoltaic power source.

16. The system of claim 13 further comprising a DC/DC converter having an input electrically connected to the outputs of the at least two DC/DC converters.

17. The system of claim 16 wherein the inputs of the at least two DC/DC converters are coupled to photovoltaic power sources.

18. The system of claim 13 further comprising a DC power distribution system having a DC bus, the DC bus electrically connected to the outputs of the at least two DC/DC converters.

19. The system of claim 18 wherein the input of each DC/DC converter is coupled to a photovoltaic power source.

20. The system of claim 13 further comprising one or more batteries electrically connected to the outputs of the at least two DC/DC converters.

21. The system of claim 20 wherein the input of each DC/DC converter is coupled to a photovoltaic power source.

22. The system of claim 13 wherein the threshold level for one of the at least two DC/DC converters is different than the threshold level for another one of the at least two DC/DC converters.

23. The system of claim 12 wherein each controller is configured to operate its DC/DC converter in a constant power region of the power delivery curve of its DC/DC converter when the output voltage of its DC/DC converter is above the threshold level.

24. The system of claim 1 wherein the controller is configured to operate the DC/DC converter in a constant power region of the power delivery curve of the DC/DC converter when the output voltage of the DC/DC converter is above the threshold level.

* * * * *

UNITED STATES PATENT AND TRADEMARK OFFICE
CERTIFICATE OF CORRECTION

| | | |
|---|---|---|
| PATENT NO. | : 8,576,591 B2 | Page 1 of 1 |
| APPLICATION NO. | : 12/976544 | |
| DATED | : November 5, 2013 | |
| INVENTOR(S) | : Phadke | |

It is certified that error appears in the above-identified patent and that said Letters Patent is hereby corrected as shown below:

In the Claims

In claim 24, at column 10, line 60, please replace "The system of claim 1" with "The DC/DC converter of claim 1".

Signed and Sealed this
Fourteenth Day of October, 2014

Michelle K. Lee
*Deputy Director of the United States Patent and Trademark Office*